United States Patent [19]

Sagarino et al.

[11] Patent Number: 4,910,040

[45] Date of Patent: Mar. 20, 1990

[54] METHOD AND PROTEIN PRODUCT HAVING ALIGNED FIBERS

[75] Inventors: Robert F. Sagarino, Fremont; Thomas Streigler, San Jose; David J. Aulik; Robert E. Christensen, both of Camarillo, all of Calif.; Jerome B. Jansen, Chelmsford, Mass.

[73] Assignee: Horizons International Foods, Inc., Burlington, Mass.

[21] Appl. No.: 172,021

[22] Filed: Mar. 23, 1988

Related U.S. Application Data

[63] Continuation-in-part of Ser. No. 17,140, Feb. 20, 1987, abandoned.

[30] Foreign Application Priority Data

Feb. 20, 1988 [WO] PCT Int'l Appl. .................. PCT/US88/00509

[51] Int. Cl.$^4$ ................................................. A23J 3/00
[52] U.S. Cl. .................................... 426/656; 426/516; 426/517; 426/549; 426/658; 426/661
[58] Field of Search ................... 425/378 S; 426/104, 426/656, 802, 516, 517, 658, 549, 661

[56] References Cited

U.S. PATENT DOCUMENTS 3,886,299 5/1975 Feldbrugge et al. ............... 426/656
4,125,635 11/1978 de Ruyter .......................... 426/506

FOREIGN PATENT DOCUMENTS 0262276 4/1988 European Pat. Off. .

*Primary Examiner*—Donald E. Czaja
*Assistant Examiner*—Celine T. Callahan
*Attorney, Agent, or Firm*—Kenyon & Kenyon

[57] ABSTRACT

A process for preparing a starch-protein fiber comprising forming a dough, relaxing the dough mixing tension in said dough, pushing said dough through a passageway having a decreasing cross-sectional area, and then pushing said dough through a further passageway and heating said dough to set the product.

26 Claims, 5 Drawing Sheets

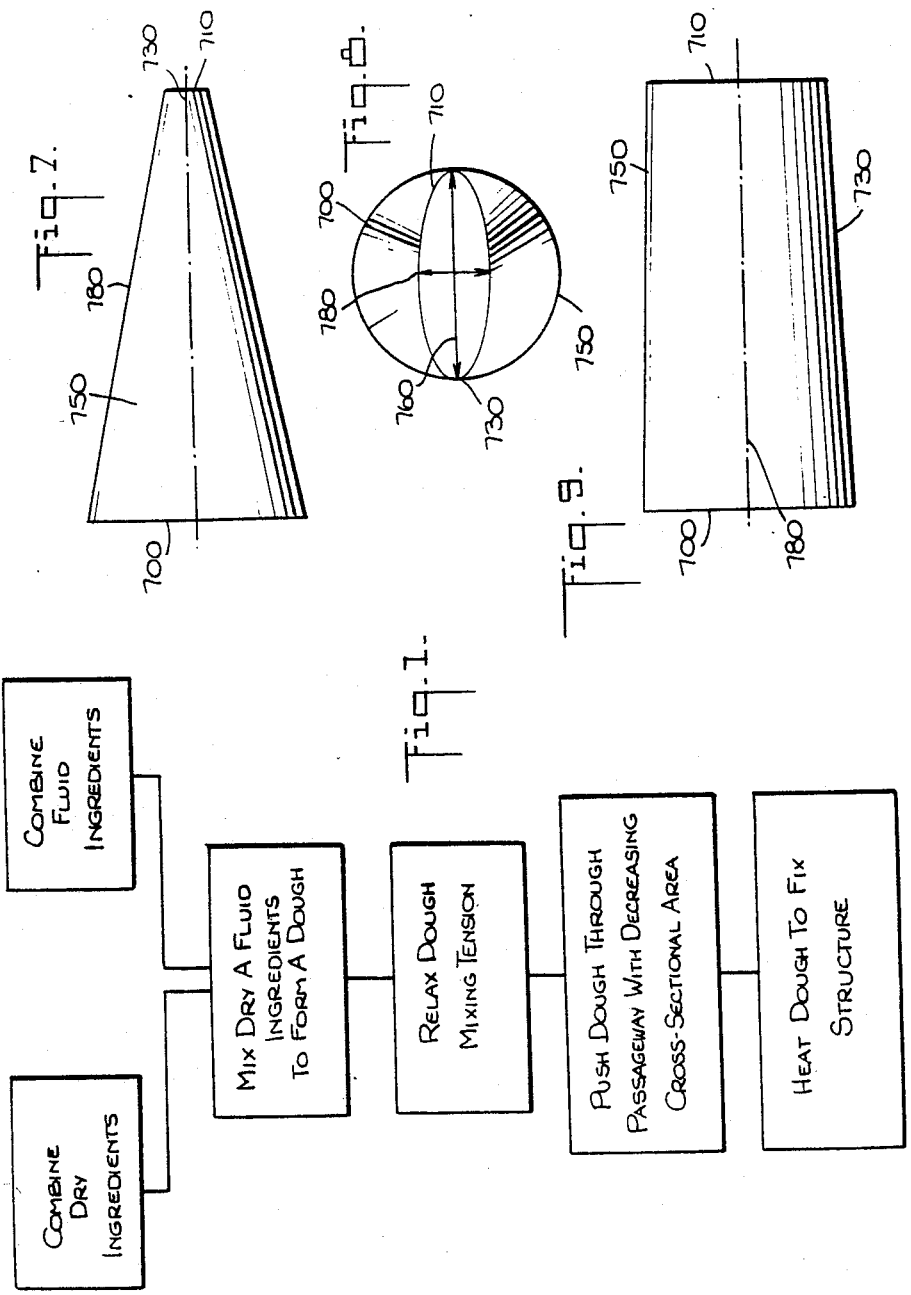

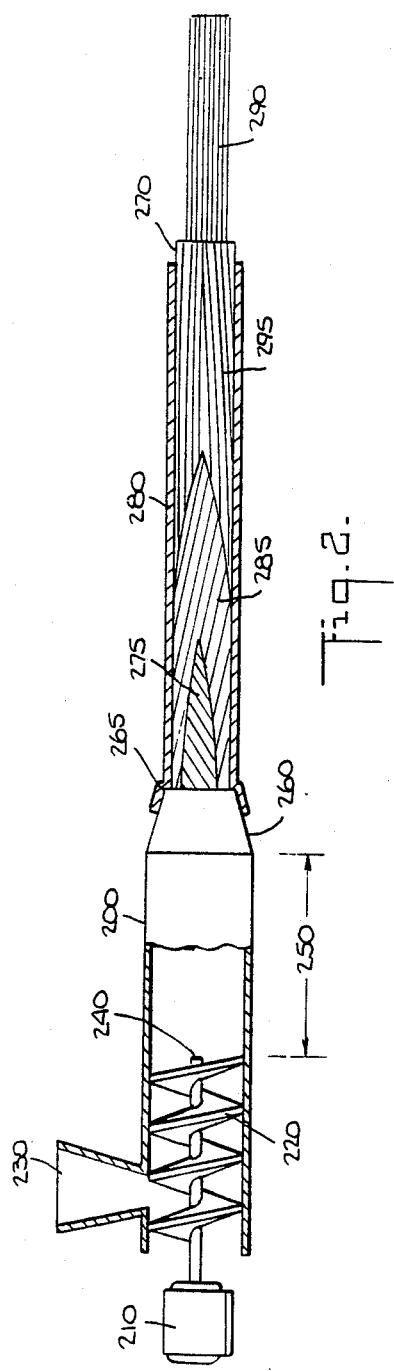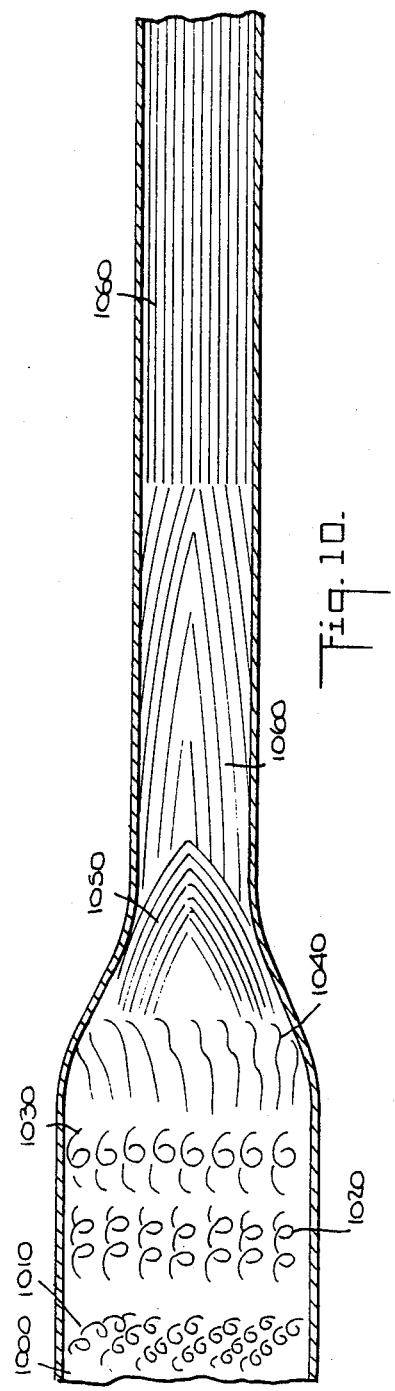

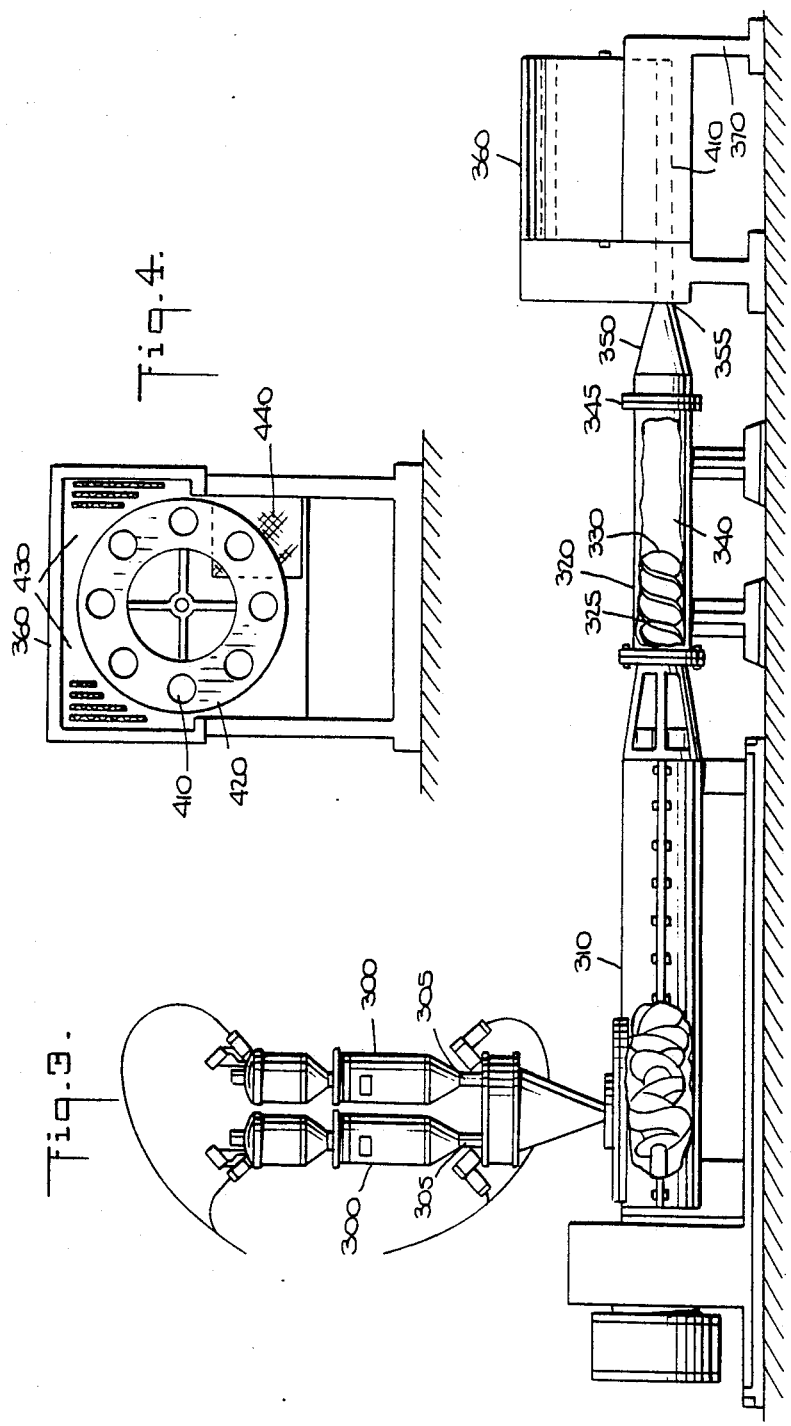

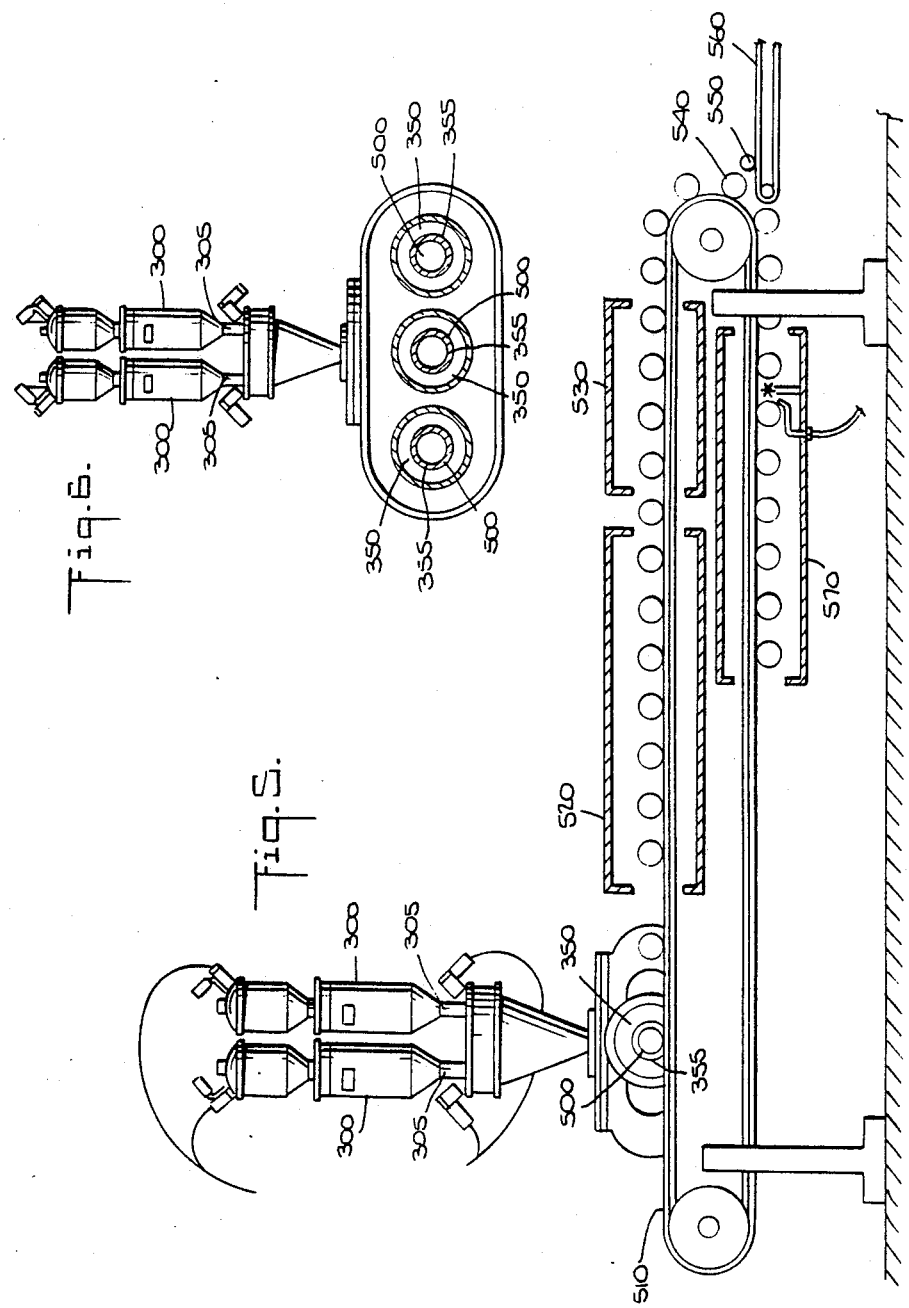

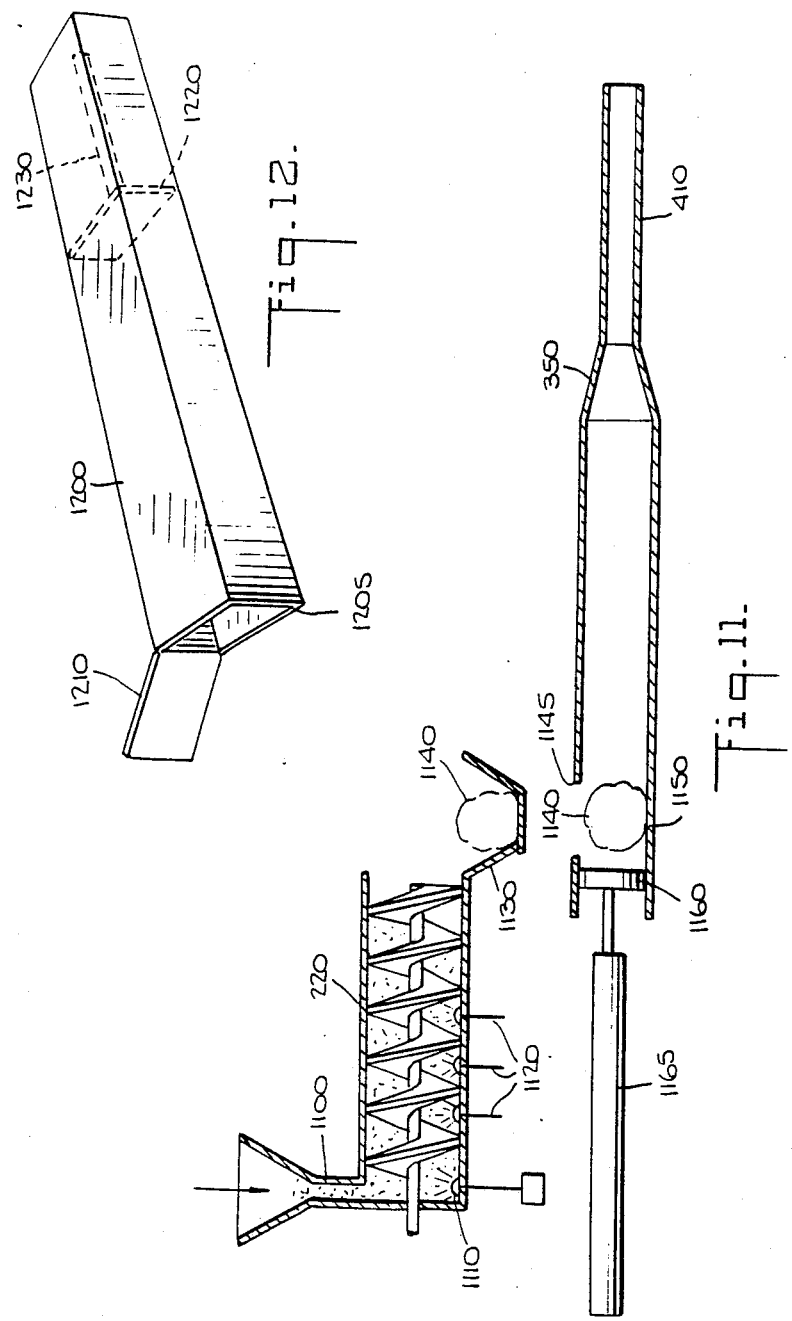

METHOD AND PROTEIN PRODUCT HAVING ALIGNED FIBERS

CROSS REFERENCE TO RELATED APPLICATIONS

This application is a continuation-in-part of applicants' application Ser. No. 017,140 filed Feb. 20, 1987.

BACKGROUND OF THE INVENTION

1. Field of the Invention

The present invention relates to producing food products of a fibrous nature and more particularly to an extrusion process for preparing food products comprising protein, carbohydrate and optionally lubricating components, said food products having aligned fibers wherein the fibers are collected into bundles. The present invention also relates to the food product produced by the process of the present invention. The bundles of fibers in the food product of the present invention are, likewise, aligned in a parallel orientation and said bundles have a substantially continuous appearance throughout the length of the food product.

BACKGROUND

The food industry for many years has attempted to provide high-protein, low-cost food products having a fibrous appearance and texture.

U.S. Pat. No. 2,211,961 issued to Meigs on Aug. 20, 1940 teaches a process for making "artificial fibers" wherein fibers are formed from globular protein which was stretched longitudinally.

U.S. Pat. No. 3,197,310 issued to Kjelson on July 27, 1965 teaches a process for preparing a proteinaceous product having fiber from a mix comprising wheat gluten and defatted oil-seed flour. Kjelson prepared his products by intimately blending the wheat gluten with defatted oil-seed flour and subsequently, setting-up or fixing the composition with elevated heat. Specifically, Kjelson noted that "distinct fibers were produce after blending for about 10 minutes. . . . " Column 3, Lines 45–6.

U.S. Pat. No. 3,814,823 issued to Yang et al. on June 4, 1974 teaches a process for making a vegetable protein product, which is characterized as having fibers, by stretching a dough in a stretching process which has a Reynolds number of less than 2,000 and heat-setting said dough either during or after the stretching step.

U.S. Pat. No. 3,88,299 issued to Feldburgge et al. on May 27, 1975 teaches a process for making a vegetable protein product, which is characterized as having fibers, by extruding a dough, for example, through a Brabender extruder, using a pressure of less than about 100 p.s.i.g.

U.S. Pat. Nos. 4,125,635 and 4,346,652 issued on Nov. 14, 1978 and Aug. 31, 1982 respectively, both to de-Ruyter, teach processes for making a vegetable protein product characterized as having fibers which are aligned in a curvi-linear manner by extruding. In the deRuyter processes, a dough comprising a vegetable protein is passed through a screw conveyor that has an internal conveying section. The configuration of the internal conveying section changes in manner effective to stretch the dough during its passage through the screw conveyor.

U.S. Pat. No. 4,275,084 issued to Ohyabu et al. on June 23, 1981 discloses "a formed food product of microfibrillar protein comprising . . . microfibrillar protein having a diameter of fiber of 10 [microns]or less . . . . " Abstract.

U.S. Pat. No. 4,615,901 issued to Yoshioka et al. on Oct. 7, 1986 discloses a process said to improve upon Yang et al.

BRIEF DESCRIPTION OF THE INVENTION

It has now been discovered that a new nutritious food product having improved eating qualities and a new fibrous texture, both visual and mouth-feel texture, can be prepared by intimately mixing dough ingredients comprising vegetable protein, carbohydrate, water and, optionally, lubricating components; passing the resulting dough through a first passageway or relaxation chamber, thereafter pushing said dough through a second passageway and subsequently, pushing said dough through a third passageway and applying sufficient heat to said dough in said third section to elevate the temperature of, and to permanently fix, the structure of said dough and thereby produce the food product of the present invention (hereinafter sometimes referred to as "starch-protein fiber" or "SPF"). In one embodiment of the present invention, the first passageway has a first cross-sectional area, the second passageway has a decreasing cross-sectional area and the third passageway has a third cross-sectional area which is less that the cross-sectional area of said first passageway.

It is an object of the present invention to provide a novel nutritious food product having aligned fiber.

Another object of the present invention is to provide a nutritious food product having aligned fiber wherein said food product has the appearance, texture and mouthfeel of meat from a chicken breast.

Also an object of the present invention is to provide a base product for further processing to produce a novel, nutritious snackfood product.

A further object of the present invention is to provide a process for preparing such a nutritious food product.

It is yet another object of the present invention to provide an apparatus for preparing such a food product.

These and other objects will become apparent from the following detailed description.

BRIEF DESCRIPTION OF THE DRAWINGS

FIG. 1 is a simplified schematic representation of the process according to the present invention;

FIG. 2 is a representation of an embodiment of the apparatus for carrying out the process of the present invention in a batch operation;

FIG. 3 is a side view of an embodiment of the apparatus to carry out the process of the present invention on a continuous basis;

FIG. 4 is a front view of an embodiment of a means for removing and realigning removable third passageways of the apparatus of the present invention;

FIG. 5 is a front view of an embodiment of an alternative means for removing and realigning removable third passageways of the apparatus of the present invention;

FIG. 6 is a front view of an embodiment of the apparatus of the present invention with a plurality of smooth bore tubes for forming the SPF;

FIG. 7 is a side view of an embodiment of a dough reformer of the apparatus of the present invention;

FIG. 8 is a front view of the dough reformer of the embodiment of FIG. 7

FIG. 9 is a top view of a dough reformer of the embodiment of FIG. 7;

FIG. 10 is a representation of the changes in the configuration of the bundles of fibers of the product of the present invention as the dough flow changes in the apparatus of FIG. 2;

FIG. 11 is a side view of an embodiment of the apparatus to carry out the process of the present invention on a batch basis; and FIG. 12 is a side view of an embodiment of the removable smooth bore third passageways of the apparatus of the present invention.

DESCRIPTION OF THE INVENTION

The source of protein used to prepare the food product of the present invention may comprise vegetable protein. In the present invention, cereals, oil seeds and combinations thereof are preferred sources of protein. It is also preferred that the source of protein contain proteins which will, under the mixing conditions of the present invention, yield protein fragments smaller than the initial proteins. It is further preferred that the source of protein contain protein which will, under the mixing conditions of the present invention yield protein fragments with a "molecular weight" of less than about 10,000 Daltons. It is also preferred that the protein fragments are able to recombine into "new" proteins. Wheat gluten is a preferred source of protein, and a particularly desirable source of protein is a wheat gluten which comprises between about 65 and about 80 percent, by dry weight (hereinafter all percentages are by weight unless specified otherwise), protein; less than about 8 percent, lubricating material; and between about 10 and about 20 percent, carbohydrate. Additionally, the wheat gluten may also comprise moisture, preferredly between about 3 and about 15 percent.

The carbohydrate in the SPF may be derived from those carbohydrates present in the source of the protein. Alternatively, the carbohydrate in the SPF may be derived from a combination of the carbohydrates present in the protein source and a supplemental source of carbohydrate. The supplemental carbohydrate source may be any starch derived from vegetable material. Wheat flour is a preferred source of supplemental carbohydrate for the SPF, and in particular a wheat flour comprising at least about 11 percent protein, on a dry basis. It is further preferred that the wheat flour source of carbohydrate comprise at least about 12 percent protein. Additionally, it is also further preferred that the wheat flour is a white, clean-flavored flour. It is also preferred that the carbohydrate source used in the process of the present invention is able to "complex" with the "new" protein formed from the protein fragments derived from the protein materials used.

The lubricating component used in making the SPF may be any material approved for use in food which reduces the friction between the dough and the internal surfaces of the processing environment. The lubricating component may be added as an ingredient, or alternatively, the lubricating component may be injected in to the surface of the dough. If the lubricating component is injected onto the dough surface, it is preferred that the lubricating component is injected onto the surface of the dough prior to the beginning of "plug" flow of the dough. Oleaginous materials are useful lubricating components in the process of the present invention. The oleaginous material used in making the SPF may be any lipid material which is approved for use in food products. It is preferred that the oleaginous material used in the process of the present invention is a solid or a semi-solid at ambient temperatures. Vegetable oils, including hydrogenated and partially hydrogenated vegetable oils such as soy bean oil, sunflower oil, safflower oil, peanut oil, olive oil and animal fats such as butterfat are particularly preferred oleaginous materials for use in the process of the present invention.

While all of the food products of the present invention have fibers, the fibers range in appearance from very fine to very course. Whether a particular product has very fine appearance, a very course appearance or some type of fiber intermediate between these two points on the spectrum of fiber appearance, depends upon many variables. Doughs with high protein levels, for example, a dough with a high wheat gluten concentration, result in courser fibers. The use of high levels of whole wheat flour, instead of white flour, used as the source of the supplemental carbohydrate will also tend to produce coarse fibers.

Additionally, the fibers of the food product of the present invention may vary in their cross-sectional appearance from very round (a cylindrical fiber) to an almost linear appearance (a sheet-like fiber). It is preferred that the product of the present invention have fibers that approach a cylindrical shape or, in other words, it is preferred that the fibers of the product of the present invention has fibers which have an approximately round cross-sectional appearance.

It has also been noted that the SPF behaves like a starch based product and not like a protein based product in that the SPF is unstable in dry heat, affected by amalyase and acids, and exhibits starch retrogradation.

Briefly, the process of the present invention comprises making a dough from the various components, relaxing any mixing tension in the dough, elongating and fixing the dough. It is believed that the process of the present invention comprises, in the following order, piston-like flow, "differential shear" flow and "plug" flow.

To begin with, a quantity of the source of protein is combined with a supplemental carbohydrate source, if any supplemental carbohydrate is used, to produce an admixture having between about 10% to about 85%, on a dry basis, protein. When a supplemental carbohydrate source is used, the source of protein and the supplemental carbohydrate source are intimately mixed by any conventional dry mixing method to produce a dry ingredient admixture. Additionally, if any other dry ingredients are included in the formulation used, these other dry ingredients can be, and preferredly are, added to, and mixed into, the dry ingredient admixture at this point. It is desirable that the dry ingredient admixture is substantially homogeneous prior to the addition of the fluid ingredients. It is also desirable that the dry mixing is carried out at about ambient temperature. Typically, the dry mixing is complete in less than about 30 minutes.

While it is believed that doughs comprising between about 10 and about 65% protein will function in the process of the present invention to make SPF, in general, it is desirable that between about 10 and about 50% of the total dough weight is protein and it is preferred that between that between about 10 and about 35% of the total dough weight is protein.

Also, it is preferred that the dough comprises between about 10 and about 60% of starch containing carbohydrate material, and it is more preferred that the dough comprises between about 10 and about 35% of starch containing carbohydrate material, and it is further preferred that the dough compresses between about 15 and 30% of starch containing carbohydrate material.

It is believed that any hydrophylic ingredients should be added and included in the homogeneous dry ingredient admixture. To improve the homogeneity of the admixture, solid and semi-solid oleaginous materials should be melted prior to their addition to the dry ingredients. Nonetheless, oleaginous materials may be added with the water, for example, as an atomized mist substantially simultaneously with the addition of a spray of water.

The dry ingredient a mixture is then combined with a quantity of water. Generally, between about 30 and about 60 percent of the combination of the dry ingredient admixture and fluid material is water. It is more preferred that between about 35 and about 45 percent of the combination of the dry ingredient admixture and fluid material is water.

When a lubricating component is included in the formulation of the SPF, generally, between about 2.5% and about 15% of the combination of the dry ingredient admixture with water is the lubricating component. When a lubricating component is included in the formulation of the SPF, it is preferred that between about 3.5 and about 10 percent of the combination of the dry ingredient admixture with water is lubricating component. In addition, the lubricating component may also be used as a carrier for an optional flavoring material.

While, optionally, the dough used in the process of the present invention may comprise a food grade acid, such as citric acid, acetic acid, malic acid, latic acid, fumeric acid and combinations thereof, it is preferred that any acid component of the dough is present at levels which do not lead to either a detectable amount of hydrolysis of the starch component, or a detectable change in the net charge of the proteinaceous material. It is further preferred that the pH of the dough is approximately neutral and it is still further preferred that the pH of the dough is at least about 6.6. It is further preferred that the pH of the dough is at least about 6.8. It has been noted that the presence of more than about 0.1% acid in the dough results in fibers which are thin and fragile, and bundles of fibers which are compact and appear dense. It is also preferred that when an acid is used in the formulation of the present invention, the acid does not prevent the formation of an extensible cohesive dough. Additionally, it is preferred that the acid is dry and that the acid, if used, is included in the homogeneous, dry ingredient admixture.

The dough, and thus the SPF of the present invention may comprise dietary fiber, as determined by the *Official Methods of Analysis* (1980) 13th Edition, Method 7.061-5, AOAC, Washington, D.C. However, it is believed the presence of more than about 4% dietary fiber in the dough inhibits fiber formation. Thus, it is further preferred that the dough used in the process of the present invention comprise less than about 4% dietary fiber.

Optionally, the dough, and thus the SPF comprises a sugar or other sweetening agent. The presence of sugar in the SPF tends to result in a softer fiber texture. Typically, the dough used in the process of the present invention comprises between about 0 and about 12%, on a total dough basis, sugar. If a sugar is used in the formulation of the produce of the present invention, it is preferred that the sugar is no more hydroscopic than sucrose, maltose or a combination thereof. If a sugar is used in the formulation of the present invention, it is preferred that the sugar is sucrose, maltose or a combination thereof, and that the dough comprises between about 1 and about 7%, on a total dough basis, sugar. It is further preferred that the sugar, if any is used, is sucrose.

Also optionally, the dough, and thus the SPF may comprise a salt approved for use in food products. The presence of salt in the SPF tends to result in a thicker fibril, a denser fiber and more compact bundles of fibers. It is believed that salt acts to protect parts of the protein which are liabile to react with other components from such interactions and that the salt interferes with the movement of water in the starch granules as manifested in a decreased rate of dehydration and an altered osmotic pressure of the system, especially that of the starch granule. The salt may also act to link to protein fragments once aligned. When a salt is included in the dough of the present invention, preferably, the dough comprises less than about 1.5%, based on the total weight of the dough, of a sodium, potassium, calcium or combination thereof salt. When a salt is used in the dough of the present invention, it is more preferred that the dough of the process of the present comprises between about 0.1 and about 1.0 % salt of the dough. It is further preferred that when a salt is used in the dough of the present invention that the dough comprises between about 0.1 and about 0.4 % salt.

Flavor enhancers, such as monoammonium glutamate, riotides and combinations thereof, may also be used in the dough of the present invention. When flavor enhancers are used, they should be used at levels which do not inhibit fiber formation.

The combination of the dry ingredient admixture with the water is mixed at a temperature less than about 30° C., and preferably at a temperature less than about 25° C., for a period of time sufficient to provide a dough which looks like a bread dough. It is further preferred that the dough has the following appearance and rheological characteristics: extensibility, cohesiveness, elasticity and a surface appearance which is translucent to opaque. It is still further preferred that when the dough is stretched by hand that it forms fibers. Typically, the combination is mixed for between about 5 and about 10 minutes. It is also preferred that the dough is not overmixed. A dough is beginning to be overmixed when it begins to be wet, sticky, fragile and have an "overmixed" sheen. It is also preferred that the mixing process is a "low energy" mixing procedure and that the dough is mixed the minimum to produce a homogeneous dough.

In one embodiment of the present invention, the dry ingredient admixture and water are both continuously fed, in metered proportions, into a first dough-mixing chamber were the combination is mixed for approximately 10 minutes. Then, on a continuous basis, the mixed combination is transferred to a further mixing chamber wherein the mixed combination is further mixed by the action of a screw-feed mechanism which transports the dough, while mixing it, into a first passageway or quiescence zone.

In another embodiment, the mixed dough is fed into a hopper from which aliquots are dropped into a piston pump.

While, it is preferred that the dough is further processed within about an hour of the completion of the first dough mixing step, it is more preferred that the dough is fresh. If the dough is held for an extended period of time after it is mixed, but before it is further processed, it is preferred that the dough is kept at a temperature at or below ambient temperature. It is also preferred that the dough is covered in a manner effective to prevent moisture loss.

As noted by Kjelson (U.S. Pat. No. 3,197,310), mixing a dough comprising wheat gluten is sufficient to produce fibers. These fibers are aligned in the path of the dough mixing process. For example, dough coming out of a screw mixing apparatus will have fibers aligned in a helical, spiral or curvi-linear shape. See, e.g. de-Ruyter (U.S. Pat. Nos. 4,125,635 and 4,346,652).

The present invention comprises a process for making, an apparatus for making, and the resulting new food product. The new food product, as formed, and before optional further processing, looks like a rope or tow of fibers. Additionally, the tow produced in practicing the present invention has a "skin" or nonfibrous sheath coating the surface of the tow. Upon further examination with the unaided eye, it is apparent that, under the "skin", the tow is comprised of a plurality of bundles of fibers. The bundles of fibers in the tow of the SPF appear to run the entire length of the product. The SPF is a composite of parallel bundles and each bundle in turn is a composite of parallel fibers. While the fibers are linear and have the appearance of running the entire length of the tow, in fact, it is believed that the length of each fiber may actually be between about 1 cm and about 20 cm.

Microscopic examination reveals that each fiber is comprised of a plurality of aligned fibrils, and each fibril is, in turn, comprised of myofibrils. Detailed compositional analysis of the myofibrils of the SPF, including examination of transmission electron micrographs and the data of Example 5, suggests that the following composition for the myofibrils. The inner core of the myofibrils appears to be substantially proteinaceous. This core is believed to comprise polymerized protein fragments which have been aligned and appear form a new "protein". It is believed that these protein fragments are polymerized to form this new "protein" when these fragments are subsequently aligned. Surrounding this proteinaceous core there appears to be a protein-carbohydrate complex which may comprise other components such as dietary fiber and minerals. The protein-carbohydrate complex appears to stabilize the SPF by the formation of a prolific number of hydrogen bonds between the components of the SPF. The protein-carbohydrate complex appears to be comprised of between about 60 to about 90 % of the complex, proteinaceous material and between about 10 and about 40 % of the complex, starch and other carbohydrates. Finally, the outer layer of the myofibril appears to be comprised of at least about 90 % (based on only the outer layer) gelatinized starch. Moreover, scanning electron micrographs (SEMs) of the myofibrils of the SPF appear to be substantially free of lumps or nodes that are sometimes associated with ungelatinized starch on the surface of a starch containing material.

The length of a tow of the product is normally determined by criteria other than conditions necessary to practice the present invention, such as the means employed to remove the tow. Unless the tow is cut, the tow will be a long, continuous mass ending only when the dough available to the process is consumed. On exiting the apparatus employed to make the SPF, the tow has the shape of the exit orifice of the apparatus.

The non-fibrous sheath or skin which coats the tow produced in practicing the present invention can vary greatly in thickness. It is now believed that the "skin" of the SPF results from either over-heating the surface of the SPF or by inducing a shear into the surface of the dough during the processing. By controlling the heating and the shear of the process, a thin, uniform skin is obtained as opposed to the skin of a product which or example experiences variable heating. The skin on a variably heated product may have a salami-like, tough skin with an average thickness of about 3 mm. It is preferred that the SPF has a skin with a thickness of less than about 1 mm, more preferably, the SPF has a skin less than about 0.5 mm. Thin skins are generally obtained when every step which involves heating is controlled to maintain sufficient moisture in the surface of the dough to prevent the dough surface from being dehydrated.

When the SPF is examined with the unaided eye, it may have the visual texture associated with animal muscle tissue. While the product frequently resembles the white meat of a chicken breast, by modifying the formula and processing conditions to the vary color of the final product and the fiber appearance, products can be obtained which resemble horse meat, frog legs, "red meat", or fish meat, or which are unlike products available heretofore. However, the SPF lacks the cross-banding which is typical of microscopic views of animal muscle tissue.

In order to produce the linear fibers in the SPF, the fibers, helical, spiral and otherwise, produced by the dough mixing process must firs be relaxed, and generally, the more energetic the mixing process, the longer the needed relaxation time. It has been observed that any dough containing fibers, whether the fibers were produced by mixing the dough, stretching the dough, forcing the dough through a screw feeder or otherwise, will, if given sufficient time, relax and lose its obvious fibrous appearance. Mixing, stretching and forcing a dough through a screw feeder all impart what is referred to herein as a dough mixing tension. Until the dough fibers are fixed, the dough mixing tension, as long as it remains, maintains the dough fibers. If the dough mixing tension from the dough mixing process is not sufficiently relaxed, then the aligned myofibrils, fibrils, fibers, and bundles of fibers of the product of the present invention are not obtained. It is necessary that this dough mixing tension is sufficiently relaxed to permit the further processing to align the myofibrils, fibril and fibers in a linear, parallel fashion. In an embodiment wherein the dough is fed by a screw feed device, the dough mixing tension is relaxed sufficiently by pushing the dough through a first passageway at a rate which provides the dough with a sufficient residence time in the first passageway to relax at least some of the dough mixing tension. In an embodiment wherein minimal mixing and a piston feed device are used, the relaxation time may be achieved during the feed to the piston feed device.

In one embodiment of the present invention, the dough is relaxed by pushing the dough at a substantially constant rate through a passageway in a manner effective to move substantially all of the dough along a path substantially parallel to the internal walls of said passageway. Hereinafter, this embodiment is referred to as having pistonlike flow. Thus, it is necessary that the fibers formed during the mixing be allowed to relax at least to the extent that the tight dough coils formed by the mixing process are not apparent in the relaxed dough. A preferred means of relaxing the dough is to push said dough through a smooth bore passageway so that the dough has a residence or quiescence time in the passageway effective to observably relax the dough mixing tension then present in the dough.

The dough is pushed through the smooth bore passageway with a pressure of less than about 80 p.s.i.g., and typically, the dough is pushed through the smooth bore passageway with a pressure less than about 35 p.s.i.g. It is preferred that the dough is pushed through the passageway with a pressure of less than about 20 p.s.i.g. and it is more preferred that the dough is pushed with a pressure of less than about 15 p.s.i.g.

Some doughs, such as doughs with a high level of wheat gluten, relax significantly slower than other doughs. It is also preferable that the quiescence zone or passageway has a constant cross-sectional area. It is also further preferred that the pressure pushing the dough is approximately constant.

Subsequent to relaxing the dough mixing tension, in some embodiments of the present invention, the dough is elongated in a non-baking step which is sufficient to align the fibers in the dough. Preferably the dough is elongated in one dimension without a significant volumetric expansion of the dough. It is further preferred that the volume of the elongated dough is less than about 125% of the initial dough volume, as measured after mixing and it is more preferred that the volume of the elongated dough is less than about 112 % of the initial dough volume, as measured after mixing.

In contrast to the lack of a significant volumetric expansion, it is preferred that the dough is elongated so that the elongated dough product has a length in one dimension which is at least 300% of the initial length of the dough in this dimension. In other words, the additional length of the dough is at least about twice the initial length of the dough. More preferably, the dough is elongated by at least about 300% so that the dough product has a length in the dimension the dough is elongated of a least about 400 % the initial length of the dough in the dimension in which the dough is elongated.

A preferred means of elongating the dough is by pushing the dough with a force applied substantially uniformly, in a substantially single dimension, through a passageway having a decreasing cross-sectional area. The dough is typically pushed through the passageway having a decreasing cross-sectional area with a pressure of less than about 80 p.s.i.g., preferably less than 35 p.s.i.g., and more preferably less than about 15 p.s.i.g. It is also preferred that the passageway with a decreasing crosssectional area has a smooth bore.

Alternatively, after relaxing at least some of the dough mixing tension, the dough is pushed through a second length of smooth bore tubing having a cross-sectional area at least as large as that of the first passageway. While traveling through this second length of smooth bore tubing, the dough is heated in a manner effective to reduce the viscosity of at least some of the dough to less than about one tenth of the dough's initial (ambient temperature) viscosity. After this change in the dough viscosity, the dough appears to travel in a "differential shear" flow. Once the "differential shear" dough flow is achieved, the dough is pushed through a further or third length of smooth bore tubing wherein the dough is further heated. This further heating causes the dough's viscosity to return to approximately the dough's initial (ambient temperature) viscosity. This second dough viscosity change creates a "plug" dough flow.

In some embodiments of the present invention, it is believed that at the point of "plug" dough flow, the dough is comprised of bundles of fibers of SPF and these bundles are aligned normal to a normal cross-sectional plane of the dough. At the point of "differential shear" dough flow, the dough is comprised of bundles of fiber of SPF, however, while some of these bundles are aligned with each other, the majority of these bundles are not in parallel alignment with any single bundle. During the pistonlike flow, the dough comprises dough fiber coils at various stages of relaxation. See FIG. 10.

The cross-sectional shape of each passageway effects the formation of the SPF. In at least the continuous process embodiments, it is believed that a passageway having a cross-sectional shape between a square and a circle wherein each side of a cross-sectional plane of the passageway normal to the direction of the dough flow has an approximately equal length, produces fibers with a circular cross-section. In contrast, a passageway having substantially unequal sides is believed to produce fibers with a linear cross-section (sheetlike fibers). Thus, while the passageways may have cross-sectional shapes which are round, triangular, elliptical, square, rectangular, star-shaped, trapezoidal or of any other polygon, it is preferred that the cross-sectional plane (i.e. the plane normal to the direction of dough flow) of each passageway is an approximately equal sided polygonal. It is further preferred that the approximately equal sided polygonal passageway cross-sectional plane approximates a circle at least as well as a square, or that the passageway cross-sectional plane is circular. It is believed that the passageway cross-sectional shape does not determine the cross-sectional of the fibers of the SPF product.

It should also be noted that all of the passageways need not have the same cross-sectional shape, and that the third passageway may have more than one cross-sectional shape. Thus, for example, the first passageway may have a round cross-sectional shape, the third passageway may have an elliptical shape, and the intervening second passageway, the passageway with the decreasing cross-sectional area, will have a cross-sectional shape which changes from a round cross-sectional shape at the end that abuts the first passageway and an elliptical shape at the end which abuts the third passageway. While substantially the total length of abutting passageways may have different cross-sectional shapes, each of the ends of abutting passageways must have the same cross-sectional shape and area. When the passageway with the decreasing cross-sectional area has different cross-sectional shapes at each end, then this passageway is sometimes also referred to herein as a dough reformer.

Additionally, in the embodiments of the present invention in which the elongated, fibrous dough is heat set in-line with the elongation step, the passageway in which the 7 elongated dough is heat set, i.e. in the third passageway, may change cross-sectional shapes, for example, from a substantially circular cross-sectional shape to a substantially square cross-sectional shape without affecting the fiber cross-sectional shape (i.e. in this example the fiber retains its circular cross-sectional shape).

It is necessary that the aligned fibers, fibrils and yofibrils are fixed after the elongation step but before the mixing tension of the aligned bundles of fibers is relaxed. The length of time required t relax the mixing tension at this stage varies. It has been noted that products in passageways having a greater surface area per unit volume of dough retain the mixing tension longer and can therefore be held for a longer period of time before fixing. Nonetheless, it is preferred that the aligned fibers, fibrils and myofibrils are fixed within about 60 minutes after the dough is elongated.

The elongated dough is then fixed by applying sufficient heat to the dough to elevate the temperature of dough to a temperature sufficient to prevent the dough structure from relaxing into a nonfibrous condition. The source of the heat used to fix the dough may be any type of heat such as convection heating, conduction heating, infra-red radiation, microwave radiation, steam injection or a combination thereof. It is preferred that the dough is heated to between about 85 and about 130° C. for between about 10 and about 90 minute to fix said dough. Once fixed, the fibers in a dough will not revert into a nonfibrous dough mass when allowed to stand. However, after fixing, unless the product is pulled apart, the fibers in the elongated dough are not necessarily readily apparent. For example, in one embodiment, the process produces "immature" fibers, which are capable of becoming pronounced or apparent fibers upon storage in a manner effective to develop the "immature" fibers such as in frozen storage.

In some embodiment of the process of the present invention, the elongated fibrous dough is heated in two stages; a first heating step and a subsequent second heating step. In embodiments wherein a second heating step is employed, the second heating step is referred to herein as a baking step. In the embodiments wherein a second heating step is not employed, the heating step includes the baking step and this single heating step is alternatively referred to herein as a baking step.

It is preferred that the baking temperature is above that necessary to plasticize the starch present in the dough and below that effective to rupture the starch granules. Either in conjunction with heating the dough to fix the dough, or subsequent to said heating, the dough may be baked. In this baking step, the dough is heated to a temperature between about 80 and about 110° C. for between about 10 and about 150 minutes, more preferably, the dough is baked at a temperature at about 85 and about 104° C. for between about 15 to about 120 minutes and most preferably the dough is heated at a temperature between about 87 and about 9°° C. for between about 30 and about 110 minutes. Typically, the oven air temperature is between about 4 and 25° C. higher than the dough temperature during baking. The source of the elevated heat applied to the dough to bake it may be provided by any conventional heating means including convection heating, conduction heating, infra-red radiation, microwave radiation, steam injection or any combination thereof.

For convenience, that part of the apparatus in which the baking step is carried out in is referred to herein as an oven. The oven may be in-line with the elongating and fixing parts of the apparatus and thus a continuous step, or the oven may be separate. If the oven is not in-line, then the passageway containing the elongated dough is removed and transferred to an oven. After baking, the product is removed from the passageway and the empty passageway is returned to concentric alignment with the elongating section of the apparatus. It is preferred that the removable passageway is a segment of the third passageway, and in some embodiments, substantially all of the third passageway. In some embodiments, the removable passageway section is located a sufficient distance from the beginning of the third passageway so that the removable passageway section begins after the "differential shear" flow phase has begun. In other embodiments comprising a removable passageway, the removable passageway substantially abuts the second passageway, but for the means to connect the second and the removable passageways.

A semi-continuous embodiment of the present invention comprises the use of a plurality of such post-elongation passageways wherein, as one such passageway is completely filled with elongated dough, the filled passageway is removed from alignment with the elongating section and another empty passageway is placed in alignment with the elongating section. The removed, removable passageway is then transferred to an oven and the dough is baked. After baking, the product is removed from the removable passageway. Some time after the next removable passageway has been removed in a manner analogous to the removal of the first removable passageway, the first removable passageway is returned to concentric alignment with the elongating section of the apparatus.

The baking step has its greatest utility with doughs which have between about 15 and about 70 percent, on a dry basis, carbohydrates. Furthermore, it is preferred that the SPF, after baking, has a final moisture product of between about 75 and about 98 percent of the moisture initially present in the dough.

When the fibers of the SPF are developed, aligned, parallel, substantially linear fibrils of the product of the present invention appear to have a substantially uniform starch coating according to SEMs.

In one embodiment, the dough is heated prior to elongation at a temperature sufficient to plasticize said dough. Generally, the dough may be plasticized by raising the temperature of the dough before elongation to between about 60 and about 85° C.

To improve the productivity of the process of the present invention, it is preferred that before the dough enters the third passageway, the dough is heated to between about 25 and about 15° C. less than the final baking temperature.

In one embodiment of the process of the present invention, after pushing the dough through (a) the first passageway with a piston-like flow in a manner effective to relax the dough mixing tension present in the dough sufficiently to prevent the dough mixing tension from effecting the product and (b) the passageway with a decreasing cross-sectional area to elongate the dough, the dough is pushed through the third passageway with a "differential shear" flow. As the dough is pushed through the third passageway, it is heated. When the dough is heated by a convectional means, at the point along the path of travel of the dough in the third passageway where substantially all of the dough, e.g. the center of the dough, has reached a transitional temperature the flow characters of the dough change and the "differential shear" flow is replaced by a transitional type of flow. It is believed that this dough flow change transitional temperature generally corresponds to the gelation temperature range of the dough. For a wheat gluten/wheat flour dough, this dough flow change temperature range is between about 85 and about 130 ° C.. As the dough continues down the third passageway, it is kept at the same temperature, or it is further heated. Preferredly, the dough is heated further. Thereafter, the dough flow changes to a "plug flow". If the dough does not comprise a sufficient lubricating component at the point where the dough flow becomes a "plug flow", the friction between the inner surfaces of the third passageway and the dough disrupt the formation of product with aligned fibers. However, the injection of a lubricating component onto the surface of the dough before, or at about the point where the dough flow becomes "plug flow" can overcome this friction and permit the production of the aligned fiber product. Preferredly, a lubricating component is injected prior to the beginning of "plug" flow.

While "aligned" bundles of fibers exist within the dough during the dough's "differential shear" flow in the third passageway, the "aligned" bundles of fibers are aligned only to a limited extent and are not aligned throughout the product. The long, parallel bundles of fibers of the SPF are aligned throughout the product during the transitional flow phase of the dough's travel through the third passageway.

While the viscosity of the dough changes during the process of the present invention when the flow character of the dough changes, the dough has a viscosity in the range of about $10^4$ to about $10^6$ centipoise. Thus, the minimum viscosity of the dough in the process of the present invention is at least about $10^4$ centipoise.

Consequently, the Reynolds number is between approximately $10^{-7}$ and approximately $10^{-5}$. Thus, it is preferred that the Reynolds number is significantly less than about 1. However, it is important that, if the SPF to be made by pushing the dough through the first passageway into a section having a decreasing cross-sectional area and then into a third section, the flow of said dough, in addition to having a Reynolds number less than about 1, is highly laminar and piston-like. It is also important that the several passageways 24 through which the dough travels are substantially concentric during the dough's travel through said passageways. This dough flow path through concentric passageways is in contradistinction to a helical or other type of dough path. The path the dough travels may be a converging linear path as the dough travels through the passageway having a decreasing cross-sectional area or is otherwise reformed and/or elongated.

It is also preferred that the force differential across the process is less than about 10 p.s.i.g. and more preferably that the force differential across the process is less than about 8 p.s.i.g. It is believed that it is relatively unimportant as to whether the driving force applied is a directly pushing force, such as a piston or a screw feeder positioned before the first passageway, or alternatively the force is a pulling force such as that exerted by a reduced pressure created at the end of the process by a vacuum pump. For convenience, any force used to move the dough in the process of the present invention shall be referred to herein as a pushing force. However, it is believed that a piston type force is preferred over a screw feed device to reduce the forces, including the shear forces, which are imparted to the dough as it is believed that the preferred processes are those processes which impart the least energy to the dough.

If so desired, the SPF may be further processed. The further processing may be to enhance the products' taste, nutritional value, both or for other purposes. Further processing steps may comprise enrobing the SPF with food approved material, frying, injecting the SPF with material approved for use in foods or a combination thereof.

For example, the SFF or another texturized protein product having a protein content in excess of about 20%, especially a texturized protein which is fibrous or cellular, and preferably a texturized protein which is fibrous can form the "center" of a confectionary product. When the SPF or a texturized protein product is used as the "center" of a confectionary product, it is preferred that if the SPF or texturized protein contains a flavoring and it is further preferred that the SPF or texturized protein contains a lipophylic flavoring. It is also preferred that when the SPF or texturized protein is used as the "center" of a confectionary product that the SPF or the texturized protein is coated with a moisture barrier (which is approved for use in food products) prior to its incorporation in to the confection as a "center".

By confectionary "center" is meant both the core of a confection such as the "filling" of a Milky Way TM candy bar or as the inclusion of a confection such as the almonds of an almond milk chocolate candy bar.

FIG. 2 depicts one embodiment of the apparatus and process of the present invention. This batch process apparatus comprises a drive means 210 for screw feed 220 in passageway 200. Dough is fed into the apparatus batch-wise through hopper 230 and enters passageway 200 where the dough is driven forward by screw feed 220. Screw feed 220 terminates at point 240 which abuts quiescence zone 250, which is also located within passageway 200. The continued addition of dough to the quiescence zone 250 by the action of the screw feed mechanism 220 forces the dough through at least the section of the quiescence zone 250 distal to the screw feed 220 in a manner which resembles the flow produced by a piston. Next, the piston-like low of dough exits quiescence zone 250, and the dough enters and flows through the abutting conical constriction 260. The smaller end of conical constriction passageway 260 abuts the smooth bore cylindrical passageway 270. It should be noted hat the internal diameter of passageway 200 and the internal diameter of the larger end of conical constriction 260 are equal and larger than the internal diameter of smooth bore passageway 270 and the smaller end of conical constriction 260. Also, the internal diameter of smooth bore passageway 270 and the smaller end of conical constriction 260 are equal.

Along the external surface of the quiescence zone 250, conical constriction passageway 260 and smooth bore cylindrical passageway 270 is situated a heating apparatus 280 which is used to heat the dough as it passes through these passageways. Thereafter the product 290 exits from the end of smooth bore cylindrical passageway 270 distal to conical constriction passageway 260.

In this embodiment of the present invention, the flow of the dough in area 275 is "differential shear", in are 285 is transitional, and in area 255 is "plug".

While not wishing to be bound by any theory, it is believed that the mixing phase breaks down at least some of the high molecular weight proteins (e.g. glutenins and gliadins, proteins which have a molecular weight of at least about 40,00 Daltons) into lower "molecular weight" protein fragments (e.g. protein fragments with a "molecular weight" of less than about 10,000 Daltons, and preferredly less than about 5,000 Daltons). One result of the fracturing of the original proteins into smaller fragments is believed to be a reduction in the secondary and tertiary globular structure of the original proteinaceous material. Instead, the dough, after this fracturing, comprises protein fragments which an be substantially aligned in a substantially linear fashion. Pushing the dough though the first passageway is believed to substantially align the protein fragments believed to be created during the mixing steps. It is further believed that when these protein fragments are substantially aligned, they interact and polymerize.

This polymerization is believed to help stabilize the new structure. The presence of a salt may also further stabilize this structure by creating additional cross-links. Hydrogen bonding between the carbohydrate materials and the "new protein" polymer is also believed to contribute to the stabilization of the SPF.

It is also believed that during the heating step, the starch present in the dough adsorbs water and becomes a plasticized "liquid starch". This plasticized "liquid starch" permits the protein fragments to move about, align themselves, and polymerize. However, if the dough is heated to too high a temperature, the starch granules rupture which precludes the formation of the plasticized "liquid starch". It is believed that the plastization of the liquid starch facilitates the formation of the aligned protein fragments and therefore the structure of the SPF. Additionally, if the dough is not heated sufficiently, the "liquid starch" is not plastized.

It is further believed that the "new protein" polymer and the starch interact in forming the fibrous product of the present invention.

EXAMPLE 1

One part wheat gluten and 1.5 parts of wheat flour are dry blended. The wheat gluten and wheat flour dry blend is then mixed with one part water until a dough is formed. The dough is pushed by the use of a screw feed device through a constant internal diameter smooth bore chamber having a 2 inch internal diameter at a rate such that it takes the dough about 30 minutes to travel through the 8 inch length of the 2 inch diameter chamber, an the dough at the end of the 2 inch chamber flows in a piston-like manner. As the dough travels through the 2 inch diameter chamber, it is gradually heated to an elevated temperature which is less than about 85° C. Next, the dough travels through a conical section where the dough is heated to about 85° C. Thereafter, the dough is further heated to about 102° C. in the dough center and the dough is pushed through about 20 inches of a smooth bore, cylindrical passageway with an internal diameter of about 1 inch. After the dough has traveled through about 15 inches of the 1 inch diameter passageway, an oil film is coated onto the dough surface.

EXAMPLE 2

A wheat gluten containing about 77% protein, about 10% moisture, about 1% fat, and about 12% starch was combined with a wheat flour containing about 78% starch, about 10% moisture and about 12% protein in a ratio of 1 part wheat gluten to 1 part of wheat flour. The wheat gluten and wheat flour were blended in a Hobart C100 mixer for 5 minutes at approximately 60 r.p.m. with a branch paddle at approximately 22° C.

Separately, one part of a retail soy bean vegetable oil (Wesson brand) was added to 8 parts of water. The oil and water mixture was stirred to distribute the oil within the water in an oil-in water dispersion. For each 11 parts of the dry wheat gluten-wheat flour mixture, 9 parts of the water and vegetable oil mixture was added in one continuous pouring. Mixing was then continued in the Hobart mixer at a speed of about 120 r.p.m. for about 5 additional minutes. This mixing was also at about 22° C. an produced a dough.

The dough was placed in a Hobart screw feed Model 612 meat grinder which pushed the dough along a 5 inch long helical path, with an internal diameter gradually decreasing from 2.25 inches to 2 inches, and into a 2.25 inch diameter by 8 inch long, smooth bore, cylindrical, first passageway. The end of the first passageway furthest from the screw feed abutted a conically shaped constriction having a length of 3 inches The diameter of the conically shaped constriction was 2.25 inches at the end abutting the first passageway and one inch at its other end. The conically shaped constriction also had a smooth internal surface. The end of the conically shaped constriction having a one inch diameter circular cross section abutted a 52 inch long, smooth bore cylinder having a 1 inch internal diameter. The first passageway, he conically shaped constriction, and the 52 inch long cylinder were all concentric.

The Hobart meat grinder provided a pressure of less than about 15 p.s.i.g. which pushed the dough through the apparatus, i.e. through the first passageway, through the conically shaped constriction, and through the 52 inch cylinder at a rate of about 10 grams dough/minute. The temperature of the dough in the Hobart meat grinder and in the first passageway was about 22° C. The residence time of the dough in the first passageway was approximately 30 minutes.

On the exterior of the conically shaped section there was an electric heater which heated the surface of the dough to between about 85 and about 90° C. by the time the dough reached the end of the conical section of the apparatus. The dough was heated throughout its about 30 minutes passage through the 52 inch long section by an external heating device which was set at about 102 ° C. The resulting product had parallel cylindrical aligned fibers which were structured in parallel aligned fiber bundles with separations between said bundles. The separation between the bundles were spaces which were void of any solids. Additionally, the final product contained approximately 25% moisture.

EXAMPLE 3

The wheat gluten and wheat flour of Example 1 were combined in a ratio of about 1 part wheat gluten to each part wheat flour. The wheat gluten and wheat flour were blended in a Hobart A200 mixer set at the second setting for 5 minutes. The blended wheat gluten and wheat flour were then transferred to a Brabender loss in weight feeder.

The blended wheat gluten and wheat flour was then fed into a Teledyne-Readco continuous processor at a rate of 1680g per hour. Concurrently, both water, at the rate of 1200g per hour, and vegetable oil, at the rate of 150g per hour, were added to the processor. The Teledyne-Readco formed a dough by the mixing the blended wheat gluten and wheat flour with the water and oil.

The dough was then transported from the Teledyne-Readco by a Bonnet 2 inch feed screw into 24.0 inch long, heated, smooth bore cylinder with a 2.0 inch internal diameter at a rate of 3030 g per hour. Importantly, the feed screw did not extend into the smooth bore cylinder. At the terminus of the feed screw, the temperature of the dough was approximately 60° C. and the dough was under a pressure of less than about 25 p.s.i.g. at that point. After traveling through the 24 inch long smooth bore cylinder, the dough entered a three inch long conically shaped constriction. The end of the conically shaped constriction which abuts the 24.0 inch long smooth bore cylinder has a 2.0 inch internal diameter which gradually decreases with a constant taper to a 1.0 inch internal diameter end.

After the dough passed the terminus of the feed screw, the flow of the dough became progressively more laminar. However, due to the inherent properties of this dough (e.g., its viscosity), the flow of the dough in the screw feed is substantially non-turbulent. Importantly, in th smooth bore cylinder section, the path traveled by the dough is substantially linear and substantially parallel to the long axis of the cylinder. Additionally, this path is substantially non-helical. Furthermore, the drag created by the friction between the dough and the inner surface of the smooth bore cylinder produces a differential flow in the dough. In this differential flow, the dough closest to the inner surface of the smooth bore cylinder travels through the cylinder at a rate slower than the rate of travel of the dough in the center of the smooth bore cylinder.

While in the three inch conical constriction, the dough was heated to a temperature of between about 85 and 90° C. At this temperature, the pressure in the system at this point increased by about 5 p.s.i.g.

The dough exited the 1.0 inch internal diameter end of the conical constriction and entered a 72 inch long, smooth bore cylinder with a 1.0 inch internal diameter. The heated dough took approximately 30 minutes to travel through the 72 inch long cylinder. During the dough's passage through the 72 inch long, smooth bore cylinder, the dough was heated by an external heating device set to approximately 102° C. This temperature converted some of the moisture in the dough into steam.

The product which exited the 72 inch long cylinder had parallel, aligned fibers which were structured in parallel, aligned bundles of fibers. The several bundles were not in continuous contact with one another. Rather, there were voids between the several bundles of fibers.

In the process of Example 2, it has been observed that the product density (g/cc) can be increased by increasing the processing pressure in the fluid transition section. The more dense product produced by increasing the processing pressure has less void volume than a product prepared at a lower pressure. Moreover, at processing pressures in excess of 30 p.s.i.g., the products of Example 2 have an appearance gradient along their radius, wherein the fibers at the center of a product formed at a pressure in excess of 30 p.s.i.g. were more dense and flatter than the superficial fibers of the same product.

EXAMPLE 4

FIG. 3 presents another embodiment of the apparatus of the present invention. Dry ingredient reservoirs 300 contain the source of protein, the source of supplemental carbohydrate and any other dry ingredients which might be added. Feed and metering means 305 deliver the dry ingredients to mixing means 310. Mixing means 310 blends the dry ingredients to produce a homogeneous dry ingredient admixture. Subsequently, an oil-in-water dispersion is continuously added to the dry ingredient admixture. The dry and liquid ingredients are mixed at ambient temperature and under a pressure of less than about ambient to form a dough. Mixing means 310 comprises a screw conveyor which in addition to mixing the ingredients to form a dough, provides a force which pushes the material forward during mixing. The dough exits the chamber of mixing means 310 and enters chamber 320. In chamber 320, screw conveyor 325 advances the dough. Screw conveyor 325 ends at screw feed terminus 330. Screw feed terminus 330 is located a distance from flange 345 sufficient to permit at least about piston-like mass flow which relaxed the dough's mixing tension. The continuous operation of screw conveyor 325 continues to add dough to the dough in the quiescence zone 340. In the portion of quiescence zone 340 abutting screw feed terminus 330, the continued addition of dough along a helical path perturbs the dough environment. However, as the addition of dough to the quiescence zone pushes the dough forward in a single dimension through the rest of the quiescence zone 340, the perturbation from the dough delivery at screw feed terminus 330 is dampened and the dough advances in an unperturbed manner. The screw conveyor 325 continues to push the dough mass causing the dough to travel through flange 345 into conical construction passageway 350 through a length of heated cylindrical passageway 355 sufficient to change the dough flow from a "differential shear" flow, but insufficient to produce "plug" flow, and then into concentric tubes 410 which are located in tube exchanger/oven 360.

FIG. 4 shows an embodiment of the apparatus of the present invention comprising a revolving apparatus containing a plurality of concentric to smooth bore passageways which are alternatively, concentrically aligned with cylindrical passageway 365. At the time they are in concentric alignment, the dough is pushed into the smooth bore passageway 410. When smooth bore passageway 410 is filled, the chamber 420 rotates to place another smooth bore passageway 410 in alignment with cylindrical passageway 365. After being removed from alignment with cylindrical passageway 365, smooth bore passageway 410 is moved to heating section 430 within tube exchanger/oven 360 wherein the dough in the passageway 410 is heated to about 102° C. for a period of about 30 minutes. Thereafter when the chamber 420 rotates further, the finished product is removed from smooth bore passageway 410 which in subsequent movements is placed in a section 440 wherein smooth bore passageway 410 is cleaned. At some later time, smooth bore passageway 410 is moved by chamber 420 back into alignment with cylindrical passageway 365. At that point, smooth bore passageway 410 is again filled with the dough of the present invention.

FIG. 5 depicts an alternative embodiment of the tube exchanger/oven of Example 3. In the tube exchanger/oven apparatus of FIG. 5, after smooth bore passageway 410 is filled with dough, it is automatically released from the head of the apparatus 355 and is carrie by conveyor belt 510 into oven 520. While smooth bore passageway 410 is in the oven 520, the dough is heated to about 102° C. for a period of about 30 minutes. Thereafter, the smooth bore passageway 410 moves into chamber 530 wherein the baked dough is further treated. Subsequent to this further treatment, smooth bore passageway 410 is moved to position 540 where the baked and treated dough product, 290 is removed from the smooth bore passageway 410 and deposited upon product conveyor belt 560 which transports the product to whatever further processing or packaging the product receives. Thereafter smooth bore passageway 410 is moved into cleaning apparatus 570 which cleans the smooth bore passageway 410 for its reuse. Subsequently, conveyor belt 510 returns smooth bore passageway 410 back to its original alignment with the end 355 of cylindrical passageway 365 of the apparatus of the present invention, where smooth bore passageway 410 is again filled with dough.

In an alternative embodiment in which the diameter at flange 345 is 4.5 inches, conical construction passageway 350 of FIG. 3 is replaced with dough reformer 750 of FIGS. 7, 8 and 9. Dough reformer 750 reforms the cross-sectional geometry of the dough that passes through flange 345 from a 4.5-inch radius round shape at end 700 of dough reformer 750 into an elliptical shape having a 4-inch major axis, 760, and a 1-inch minor axis, 770, at exit 710 of dough reformer 750. Line 730, on the external surface of dough reformer 750, is normal to both the entrance 700 and the exit 710 of dough reformer 750 and runs through an end of the major axis 760 of elliptical end 710 of dough reformer 750. Line 780, also on the external surface of dough reformer 750, is also normal to both entrance 700 and exit 710 of dough reformer 750. However, line 780 run through an end of the minor axis 770 of the elliptical end 710 of dough reformer 750. The reformed dough then travels through an elliptical tube having a 4-inch major axis and a 1-inch minor axis. The dough has a 30 minute residence time in the elliptical tube wherein the dough is heated to 102° C.

EXAMPLE 5

Example 5 illustrate how a chocolate confection may be prepared using SPF. An effective amount of a chocolate mint flavor was added to the dough ingredients of Example 2 prior to mixing. The dough was mixed and otherwise processed as set forth in Example 2, except that the cross-sectional shape of the 72 inch long smooth bore cylinder with a 1.0 inch internal diameter changed from circular to square with one inch sides about 20 inches from the end of the 3 inch conical constriction. This change in the cross-sectional shape occurred at a point where the dough flow was believed to be transitional.

The chocolate mint flavored product was cut into approximately ½×½×¼ inch cubes. The cubes are coated with a moisture barrier approved for use in food products an then coated with chocolate in a conventional chocolate coating process to produce a new confection.

EXAMPLE 6

Three sets of samples of wheat gluten, a water and wheat gluten (only) mixed dough and the resulting product were fractionated, and the protein present analysised, according to the method of Feillet, P., et al. "Modifications in Durum Wheat Protein Properties During Pasta Dough Sheeting," Cereal Chemistry, 54 (3), 580 587, 1977. There was little difference in the amount of solubles found in the various fractions of the gluten versus the mixed dough samples. For the product, however, there is a substantially lower amount of solubles found in the ethanol and chloroethanol extracts and a commensurate higher amount of insolubles.

TABLE I

| SAMPLE | Sodium Chloride extract | Ethanol extract | 2-Chloro-ethanol extract | Insolubles[1] |
| --- | --- | --- | --- | --- |
| Gluten I | 39[2] | 370 | 240 | 420 |
| Gluten II | 45 | 340 | 190 | 480 |
| Gluten III | 34 | 360 | 180 | 550 |
| Dough I | 43 | 340 | 190 | 510 |
| Dough II | 36 | 340 | 180 | 490 |
| Dough III | 36 | 360 | 200 | 510 |
| Product I | 40 | 140 | 47 | 830 |
| Product II | 36 | 130 | 48 | 830 |
| Product III | 25 | 130 | 42 | 920 |

[1]The insolubles from the gluten and the dough samples were gelled. The insolubles from the product samples were dry appearing particulates.
[2]mg dry solids per gram dry sample Additionally, the insolubles from the product fraction have been characterized as being bread crumb like. Each of the insolubles fractions from the above analysis was further analysised according to AOAC approved methods. The results of these analyses are presented in the table below.

TABLE II

| Product Component | I | II | III |
| --- | --- | --- | --- |
| Protein[1] | 79.4 | 78.1 | 78.8 |
| Carbohydrate[2] | 11.1 | 11.5 | 10.5 |
| Total Dietary Fiber | 7.9 | 5.9 | 9.6 |
| Total Sulfur | 0.78 | 0.71 | 0.64 |
| Other Ash | 1.00 | 0.79 | 0.69 |
| TOTAL | 100.18 | 97.00 | 100.23 |

[1]as % N × 6.25
[2]as Starch. The insolubles fraction of both the glutens (the starting material) and the doughs consisted essentially of proteinaceous materials.

Additionally, the starting material (the wheat lluten) had less dietary fiber according to the AOAC methodology than was found the insoluble fraction according to this analytical procedure.

EXAMPLE 7

SPF is produced in the form of a ¾ inch wide, ¼ inch thick bar containing a lipophylic chocolate flavoring. The SPFbar is sliced into 4 inch sections and each section is coated with a food approved moisture barrier. The coated sections are then enrobed with nuts, raisins and chocolate.

EXAMPLE 8

FIG. 11 presents another alternative embodiment of the apparatus of the present invention. Blended dry ingredients are metered into a low energy continuous mixer through a metering device 1100. Metered amounts of an atomized oleaginous material are sprayed onto the dry ingredient admixture as it enters the mixer. At several locations in the first half of the mixer, the added aqueous materials (water plus an ingredients which are added in an aqueous carrier) are sprayed at several points, 1120, onto the dry-ingredient/oleaginous material admixture. The entire combination is then mixed into a dough.

As the dough exits the mixer, the dough enters a dough hopper, 1130. A charge of dough is collected in the dough hopper 1130 and this dough charge, 1140, is discharged into a first passageway 1150 through a first passageway aperture 1145. Once the dough charge 1140 is in the first passageway 1150, piston 1160, driven by piston driver 1165, pushes the dough charge 1140 through the first passageway 1150 with a pressure less than about 10 p.s.i.g. through a second passageway having a decreasing cross-sectional area 350, and into the third passageway 410.

The dough in the smooth bore third passageway is then treated as described in Example 4. Alternatively, the smooth bore third passageway 410 is replaced by a removable third passageway comprising a smooth bore canister such as that depicted in FIG. 12.

Canister 1200 of FIG. 12 is fabricated from stainless steel, preferably from unpolished stainless steel and is about 7.5 cm square by about 1.5 m. Canister 1200 is, when in-line with the converging section 350, mounted a short distance from the narrowest end of converging section 350 and canister orifice 1205 abuts the prior process apparatus a short distance from the narrowest part of converging section 350. As canister 1200 is filled with dough charge 1140, which enters canister through canister orifice 1205, the leading face of dough charge 1140 abuts diaphragm 1220, which is mounted within smooth bore canister 1200 in a manner that permits diaphragm 1220 to move substantially friction free along the length of canister 1200. However, the free movement of diaphragm 1220, and thus the free movement of dough charge 1140, is impeded by back pressure device 1230 (e.g. a spring or a piston) Typically, the back pressure device 1230 exerts a substantially constant back pressure of less than about 10 p.s.i.g.

Once canister 1200 is filled with dough charge 1140, gate 1210 is closed.

The size of dough charge 1140 is adjusted so that dough charge 1140 occupies less than about 80 % of the internal volume of canister 1200 prior to the baking (fixing) step, thus providing for an expansion of dough charge 1140 during the baking step against a back pressure as exerted by back pressure device 1230 through diaphragm 1220.

Once canister 1200 is filled with dough charge 1140 and sealed with gate 1210, canister 1200 is transferred to an about 104 to 110° C. air temperature convection oven where the dough charge 1140 is baked for about 90 minutes. After baking, the SPF product is removed from the canister and the canister is reused.

What we claim is:

1. A method for preparing a food product having aligned fibers which comprises:
   (a) mixing a protein source and carbohydrate source, said protein source and said carbohydrate source having sufficient protein and carbohydrate content to provide a nutritious food, with water in a manner effective to form a dough;
   (b) pushing said dough substantially linearly through a first passageway, said first passageway having a substantially constant cross-section, wherein the dough mixing tension of said dough is substantially relaxed prior to the exit of the first passageway;
   (c) then pushing said dough through a second passageway having a decreasing cross section, and said second passageway is effective to elongate said dough sufficiently to provide bundles of fibers;
   (d) then pushing said dough through a third passageway having a substantially constant cross section for a distance effective to align substantially all of the bundles of fibers then present in said dough said first, second and third passageways being in concentric alignment during said pushing steps; and
   (e) thereafter, applying sufficient heat to fix the fibers of said dough in a linearly aligned configuration.

2. A method for preparing a food product having aligned fibers according to claim 1 wherein pushing said dough through said second passageway is effective to elongate said dough by at least about 200%.

3. A method for preparing a food product having aligned fibers according to claim 1 wherein pushing said dough through said second passageway is effective to elongate said dough by at least about 300%.

4. A method for preparing a food product having aligned fibers according to claim 1 which further comprises:
   (a) removing a section of said third passageway from its concentric alignment with said first and second passageways; and
   (b) transporting said section of said third passageway to an oven.

5. A method for preparing a food product having aligned fibers according to claim 4 which further comprises:
   (a) removing said section of said third passageway from said oven; and
   (b) returning said section of said third passageway to concentric alignment with said first and second passageways.

6. A method for preparing food product having aligned fibers according to claim 1 wherein said dough is heated in said third passageway.

7. A method for preparing food product having aligned fibers according to claim 1 wherein said dough is fixed by heating said dough to a temperature between about 80 and 130° C.

8. A method for preparing a food product having aligned fibers according to claim 1 which further comprises heating said dough in said second passageway sufficiently to plasticize the carbohydrate in said dough.

9. A method for preparing a food product having aligned fibers according to claim 8 wherein said dough is baked for at least about one half hour at a temperature between about 85 and about 104° C.

10. A method for preparing a food product having aligned fibers according to claim 4 which further comprises enclosing said dough within said removable passageway.

11. A method for preparing a food product having aligned fibers according to claim 10 wherein said dough is baked for at least about one half hour at a temperature between about 85 and about 104° C.

12. A method for preparing a food product having aligned fibers according to claim 1 which further comprises applying sufficient heat to said second passageway to plasticize said dough.

13. A food product prepared by the process of claim 1.

14. A method for preparing a food product having aligned fibers according to claim 1 which further comprises controlling the expansion of the dough volume during the elongation of said dough to produce an elongated dough having less than about 125% of the dough volume after mixing.

15. A process according to claim 1 which further comprises actively exerting a back pressure on said dough during heating.

16. A method for preparing a food product which resembles animal muscle fibers, which method comprises
   (a) forming a dough mixture comprising wheat gluten, wheat flour, water and vegetable oil;

(b) passing said dough through an extrusion device characterized by a means to move said dough with a pistonlike flow;

a smooth bore tubular first section having a first cross-sectional area;

a smooth bore tubular second section having a second cross-sectional area;

a smooth bore section connecting said first section with said second section;

wherein said first cross-sectional area is greater than said second cross-sectional area;

wherein the throughput in said first section provides a residence time sufficient to relax the mixing tension in said dough;

wherein said dough is passed through said first section at a rate and against a pressure which provides a laminar flow there through; and (c) heating said dough in said second section to at least about 85° C. and wherein said dough exits from said extrusion device at approximately ambient pressure.

17. A food product prepared by the process of claim 16.

18. A process according to claim 16 which further comprises actively exerting a back pressure on said dough during heating.

19. A method for preparing a food product having aligned fibers which comprises:

(a) forming a dough;

(b) relaxing at least some of the mixing tension in said dough produced by the dough forming process;

(c) pushing said dough in a piston-like manner through a first passageway having a cross-sectional area which cross-sectional area decreases along the direction of the dough flow;

(d) pushing said dough through a second passageway in a manner effective to create a differential shear flow in said dough; and (e) subsequently, pushing said dough through said second passageway in a manner effective to create a plug flow in said dough.

20. A process according to claim 19 which further comprises heating said dough subsequent to said plug flow.

21. A process according to claim 20 which further comprises actively exerting a back pressure on said dough during heating.

22. A process according to claim 19 which further comprises heating said dough prior to said plug flow.

23. A process according to claim 22 which further comprises heating said dough subsequent to said plug flow.

24. A process according to claim 23 which further comprises actively exerting a back pressure on said dough during heating.

25. A method for preparing a food product having aligned fibers which comprises:

(a) forming a dough;

(b) relaxing at least some of the mixing tension in said dough produced by the dough forming process by pushing said dough, in a piston-like manner, through first smooth bore chamber;

(c) while continuing to pus said dough, heating said dough in a manner effective to decrease the viscosity of at least some of said dough to less than about one tenth of the initial viscosity of said dough and to create a differential shear slow in said dough; and (d) while continuing to push said dough, further heating said dough in a manner effective to increase the viscosity of at least part of said dough having a reduced viscosity to approximately the initial viscosity of said dough and to create a plug flow in said dough.

26. A process according to claim 25, which further comprises actively exerting a back pressure on said dough during heating.

* * * * *

UNITED STATES PATENT AND TRADEMARK OFFICE
CERTIFICATE OF CORRECTION

PATENT NO. : 4,910,040          Page 1 of 6

DATED : March 20, 1990

INVENTOR(S) : SAGARINO et al.

It is certified that error appears in the above-identified patent and that said Letters Patent is hereby corrected as shown below:

Abstract, line 6, change "the product." to --the product. Also set forth are ways of utilizing texturized proteins including the use of such proteins in confectionary products--.

Col. 1, line 40, change "produce" to --produced--.

Col. 1, line 49, change "3,88,299" to --3,886,299--.

Col. 1, line 63, change "in manner" to --in a manner--.

Col. 2, line 26, change "that" to --than--.

Col. 2, line 66, change "Fig. 7" to --Fig. 7;--.

Col. 4, line 61, change "that between that between" to --that between--.

Col. 4, line 68, change "compresses" to --comprises--.

Col. 5, line 13, change "a mixture" to --admixture--.

Col. 5, line 31, change "latic" to --lactic--.

Col. 5, line 57, change "comprise" to --comprises--.

Col. 6, line 11, change "liabile" to --liable--.

Col. 6, line 54, change "were" to --where--.

Col. 7, line 10, change "See, e.g." to --*See, e.g.*--.

UNITED STATES PATENT AND TRADEMARK OFFICE
CERTIFICATE OF CORRECTION

PATENT NO. : 4,910,040

DATED : March 20, 1990

INVENTOR(S) : SAGARINO et al.

It is certified that error appears in the above-identified patent and that said Letters Patent is hereby corrected as shown below:

Col. 7, line 34, change "that the" to --the--.

Col. 7, line 38, change "appear form" to --appear to form--.

Col. 8, line 6, change "which or" to --which for--.

Col. 8, line 12, change "less" to --of less--.

Col. 8, line 21, change "to the vary" to --to vary--.

Col. 8, line 30, change "firs" to --first--.

Col. 9, line 8, change "pressure less" to --pressure of less--.

Col. 9, line 52, change "crosssectional" to --cross-sectional--.

Col. 10, line 59, change "the 7 elongated" to --the elongated--.

Col. 10, line 66/67, change "yofibrils" to --myofibrils--.

Col. 11, line 1, change "t relax" to --to relax--.

Col. 11, line 18, change "minute" to --minutes--.

Col. 11, line 28, change "embodiment" to --embodiments--.

Col. 11, line 45, change "temperature at" to --temperature between--.

UNITED STATES PATENT AND TRADEMARK OFFICE
CERTIFICATE OF CORRECTION

PATENT NO. : 4,910,040

DATED : March 20, 1990

INVENTOR(S) : SAGARINO et al.

It is certified that error appears in the above-identified patent and that said Letters Patent is hereby corrected as shown below:

Col. 11, line 48, change "9°" to --95°--.

Col. 12, line 66, change "C.." to --C.--.

Col. 13, line 5, change "of product" to --of a product--.

Col. 13, line 31, change "to be" to --is to be--.

Col. 13, line 34, change "number less" to --number of less--.

Col. 13, line 36, change "24 through" to --through--.

Col. 13, line 64, change "valve, both or" to --valve, or--.

Col. 14, line 1, change "SFF" to --SPF--.

Col. 14, line 9, change "flavoring and it" to --flavoring, it--.

Col. 14, line 15, change "in to" to --into--.

Col. 14, line 34, change "low" to --flow--.

Col. 14, line 39, change "hat" to --that--.

Col. 14, line 55, change "are" to --area--.

Col. 15, line 2, change "an be" to --can be--.

Col. 15, line 3, change "though" to --through--.

UNITED STATES PATENT AND TRADEMARK OFFICE
CERTIFICATE OF CORRECTION

PATENT NO. : 4,910,040

DATED : March 20, 1990

INVENTOR(S) : SAGARINO et al.

It is certified that error appears in the above-identified patent and that said Letters Patent is hereby corrected as shown below:

Col. 15, line 15, change "adsorbs" to --absorbs--.

Col. 15, lines 21-22, change "plastization" to --plasticization--.

Col. 15, line 25, change "plastized" to --plasticized--.

Col. 15, line 39, change "an the" to --and the--.

Col. 15, line 64, change "oil-in water" to --oil-in-water--.

Col. 16, line 3, change "an" to --and--.

Col. 16, line 11, change "inches  The" to --inches.  The--.

Col. 16, line 19, change "he" to --the--.

Col. 16, line 57, change "by the mixing" to --by mixing--.

Col. 17, line 12, change "th smooth" to --the smooth--.

Col. 18, line 56, change "carrie" to --carried--.

Col. 18, line 63, change "540 where" to --540, where--.

Col. 18, line 64, change "product, 290" to --product 290--.

Col. 18, line 66, change "560 which" to --560, which--.

Col. 19, line 25, change "run" to --runs--.

UNITED STATES PATENT AND TRADEMARK OFFICE
CERTIFICATE OF CORRECTION

PATENT NO. : 4,910,040

DATED : March 20, 1990

INVENTOR(S) : SAGARINO et al.

It is certified that error appears in the above-identified patent and that said Letters Patent is hereby corrected as shown below:

Col. 19, line 35, change "illustrate" to --illustrates--.

Col. 19, line 51, change "an" to --and--.

Col. 19, lines 58-59, change "analysised" to --analyzed--.

Col. 20, line 19, change "analysised" to --analyzed--.

Col. 20, line 35, change "lluten" to --gluten--.

Col. 20, line 37, change "found the" to --found in the--.

Col. 20, line 43, change "SPFbar" to --SPF bar--.

Col. 20, line 56, change "an" to --any--.

Col. 20, line 68, change "pressure less" to --pressure of less--.

Col. 21, line 17, change "enters canister" to --enters the canister--.

Col. 21, line 25, change "piston) Typically" to --piston). Typically--.

Col. 24, line 24, change "through first" to --through a first--.

UNITED STATES PATENT AND TRADEMARK OFFICE
CERTIFICATE OF CORRECTION

PATENT NO. : 4,910,040

DATED : March 20, 1990

INVENTOR(S) : SAGARINO et al.

It is certified that error appears in the above-identified patent and that said Letters Patent is hereby corrected as shown below:

Col. 24, line 25, change "pus" to --push--.

Col. 24, line 29, change "slow" to --flow--.

Signed and Sealed this

Fifteenth Day of September, 1992

Attest:

DOUGLAS B. COMER

*Attesting Officer*   *Acting Commissioner of Patents and Trademarks*